United States Patent [19]

Dey et al.

[11] Patent Number: 5,893,932
[45] Date of Patent: Apr. 13, 1999

[54] ADDRESS PATH ARCHITECTURE

[75] Inventors: Shankar Dey, San Jose, Calif.; Ming Zhao; Dinh Kim Bui, both of Austin, Tex.

[73] Assignee: Advanced Micro Devices, Inc., Sunnyvale, Calif., CA

[21] Appl. No.: 08/735,466

[22] Filed: Oct. 23, 1996

[51] Int. Cl.[6] .................................................. G06F 12/00
[52] U.S. Cl. .................. 711/211; 345/506; 395/800.32; 395/800.43; 711/2; 711/4; 711/5; 711/104; 711/105; 711/169; 711/200; 711/201; 711/202; 711/212; 711/220
[58] Field of Search .................. 395/800.32, 800.43; 711/104–105, 2, 4–5, 200–202, 211–212, 220, 169; 345/506

[56] References Cited

U.S. PATENT DOCUMENTS

| | | | |
|---|---|---|---|
| 4,675,808 | 6/1987 | Grimm et al. | 711/211 |
| 4,937,734 | 6/1990 | Bechtolsheim | 711/202 |
| 5,175,835 | 12/1992 | Beighe et al. | 711/212 |
| 5,603,041 | 2/1997 | Carpenter et al. | 395/309 |
| 5,640,527 | 6/1997 | Pecone | 711/5 |
| 5,825,372 | 6/1994 | Artieri | 345/509 |

Primary Examiner—Tod R. Swann
Assistant Examiner—Denise Tran
Attorney, Agent, or Firm—H. Donald Nelson

[57] ABSTRACT

A microprocessor system integrated on a chip having one or more address generation devices, at least one memory location, and at least one peripheral unit. The address path is divided into two portions having a first logic unit conditioning the address from the one or more address generation devices on the first portion of the address path for gating onto the second portion of the address path. The first logic unit converts a single 16 bit address location into two 8 bit address locations. The first logic unit maintains a first address on the second address path when the CPU is in a next address pipeline mode. A second logic unit selects a memory architecture so that the system can address DRAM units having a various number of rows and/or columns.

9 Claims, 4 Drawing Sheets

ADDRESS PATH ARCHITECTURE

BACKGROUND OF THE INVENTION

1. Field of the Invention

This invention relates generally to a high performance microprocessor architecture and, more particularly to a high performance microprocessor address bus architecture.

2. Discussion of the Related Art

FIG. 1 shows a typical prior art address bus architecture 100 which includes a mux 102 to select between an address ADDR_CPU, indicated at 104, generated by a CPU (central processing unit-not shown) and an address ADDR_DMA, indicated at 106, generated by a DMA (direct memory access device-not shown). A select input 108 from a bus master selects which address is output onto the address bus (ADDR) 110. Also shown are peripherals that are connected to address bus 110. The peripherals include an SCU (a serial communications unit) 112, a DMA (a direct memory access unit) 114, a WDT (watchdog timer) 116, a TMR (a timer unit) 118, and a PMU (power management unit) 120. As is known in the computer art an address contains specific information that "notifies" a targeted peripheral that the peripheral has information that needs to be placed on a data path (not shown) for use by other components in the computer.

The prior art devices, as represented by the device shown in FIG. 1, are adequate for those instances when the memory unit has a given memory architecture, that is, a given number of bits to address a location in the memory. However, when it is desired to address other memory architectures, the prior art devices were unable to address them. As is known in the computer art, memory devices which can be made up of DRAM (dynamic random access memory) in which the address input is made up of a row address and a column address, are manufactured with different architectures. For example, some have a nine bit row address and a nine bit column address, others have a ten bit row address and a ten bit column address, and others could have a ten bit row address and an eleven bit column address. As can be appreciated, the prior art device shown in FIG. 1 could not address any DRAM architecture.

In addition, the prior art devices, represented by the device shown in FIG. 1, are incapable of addressing a different size memory, that is, information or data stored in an eight bit data size memory if the CPU or DMA only generates memory addresses based upon the presumption that the information or data is stored in 16 bit data size memory.

Furthermore, the prior art devices, represented by the device shown in FIG. 1, are incapable of adapting if the CPU is in a next address pipeline addressing mode. The prior art device, for example, would latch the next address to the bus before the memory was ready for it.

What is needed, therefore, is an address bus architecture that is (1) capable of addressing different size DRAM architectures, that is (2) capable of addressing different size memory, for example, eight bit memory locations as well as sixteen bit memory locations, that is (3) capable of handling memory addresses when the CPU is in a next address pipelining mode, and that is (4) capable of testing the core memory independently.

The inventors designed a computer architecture that involved the integration of a 386 core processor with many on-chip peripherals. One of the design goals was for the 386 microprocessor to be able to perform memory cycles at 33 MHz and $V_{cc}$=5 volts made in CS22 technology (a technology utilized at the assignee of this application). A second design goal was that the architecture must work with both 8 bit data size and 16 bit data size memories as well as with DRAM memory. The address output from the 386 microprocessor is pipelined in some read/write cycles but in not all cycles. The microprocessor has an input pin called "NA" which acts as a request signal to the microprocessor to pipeline the address outputs for the next read/write cycle.

However, the integrated design did not have an extra pin to make NA available outside the chip. This means that the address outputs of the integrated design could not be pipelined outside the chip even if the microprocessor pipelines the addresses inside the chip. This required logic to be designed in the address output path to accommodate pipelining inside the integrated chip.

In addition, it was required that the integrated chip be able to provide row and column addresses directly to DRAM memory. This required logic needs to be designed in the address output path.

In order to test the core processor memory independently, it is required that the core address outputs be made directly available at pads in testmode (TSTMOD).

To accommodate all of these requirements a special address path design was necessary.

In addition, to achieve the fastest timing, a special scheme was developed to connect the onchip peripherals to different segments of the address path. Decoding addresses to determine if an eight bit or a sixteen bit memory was being addressed needed to be done as early as possible. Therefore, address decode logic was placed closest to the core address outputs. Since the core always executes as if 16 bit data size memory was being addressed, and since it was required for the integrated design to be able to work with 8 bit data size memories, it was necessary for a state machine to be added to create 2 cycles for each core read/write cycle when necessary to address an 8 bit data size memory.

It was also necessary to place the address decode logic for on-chip control registers closest to the core address outputs. This helped to make the control register read/write cycles in the least number of cpu clocks.

SUMMARY OF THE INVENTION

The present invention is directed to a microprocessor system having one or more address generation devices, at least one memory location, and at least one peripheral unit with the address path from the address generation devices divided by a first logic unit into a first address path and a second address path wherein the first logic unit conditions an address from the first address path for the second address path.

The first logic unit converts a single address for a 16 bit data size memory into two addresses for an 8 bit data size memory. The first logic unit maintains a first address on the second address path when the CPU is in a next address pipeline mode.

The second address path terminates in a second logic unit which functions to select a memory architecture.

A first device, such as a multiplexer, selects an address from the one or more address generation devices. The one or more address generation devices can be, for example, a CPU or a DMA.

A second device, such as a multiplexer, selects an output from the second logic unit or from the second address path.

A third device, such as a multiplexer, selects an output from the second device or an address directly from the CPU for test mode purposes.

A memory control unit reads the addresses from the address generation devices and signals the first logic device that a pipelined address is forthcoming or that a multiple cycle is required.

The present invention is better understood upon consideration of the detailed description below, in conjunction with the accompanying drawings. As will become readily apparent to those skilled in this art from the following description there is shown and described a preferred embodiment of this invention simply by way of illustration of the mode best suited to carry out the invention. As it will be realized, the invention is capable of other different embodiments, and its several details are capable of modifications in various, obvious aspects all without departing from the scope of the invention. Accordingly, the drawings and descriptions will be regarded as illustrative in nature and not as restrictive.

BRIEF DESCRIPTION OF THE DRAWINGS

The accompanying drawings incorporated in and forming a part of the specification, illustrate the present invention, and together with the description serve to explain the principles of the invention. In the drawings.

DETAILED DESCRIPTION

Figure 1:
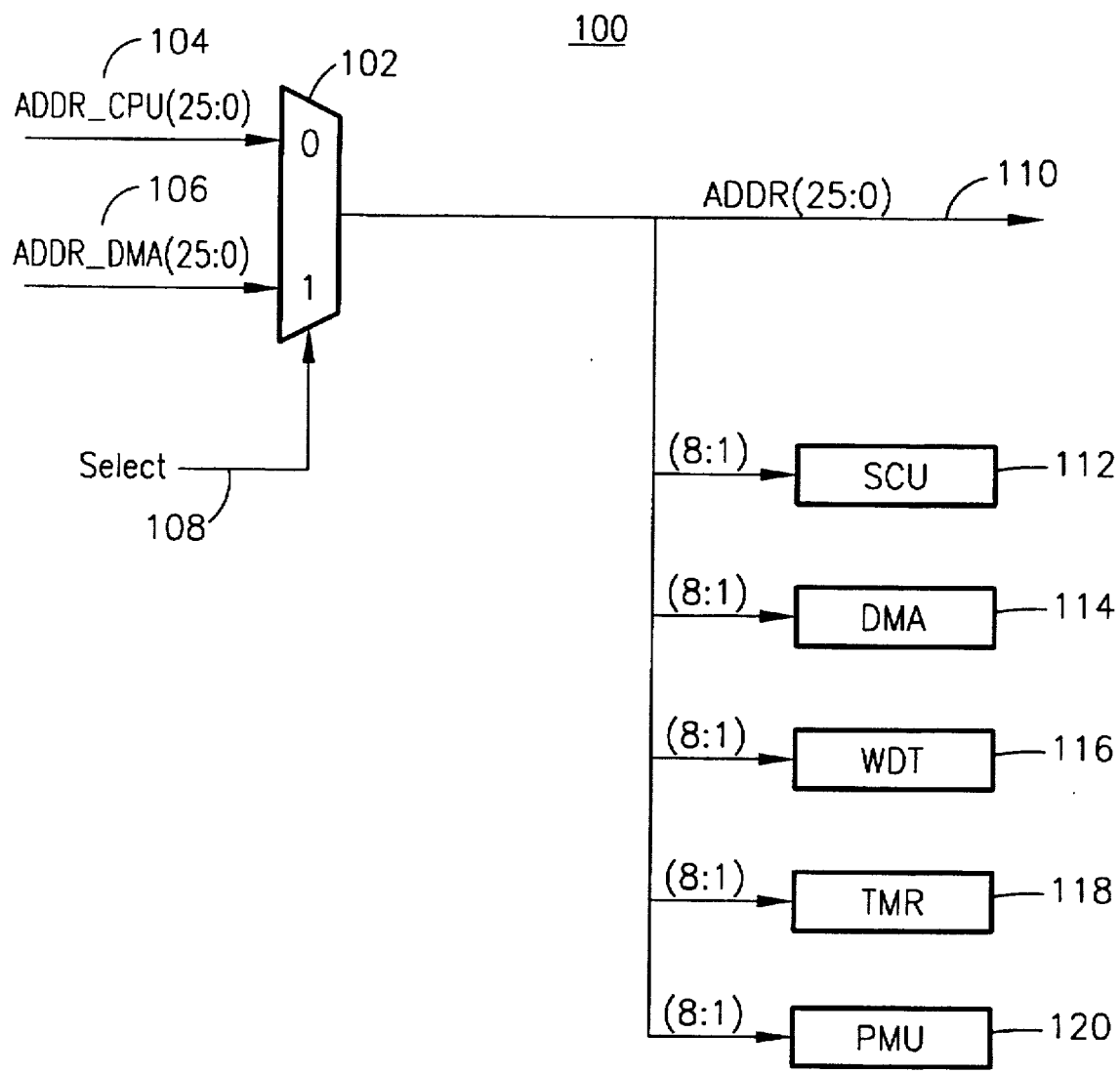
FIG. 1 is a block diagram of an address bus architecture representative of prior art address bus architectures.
Figure 2:
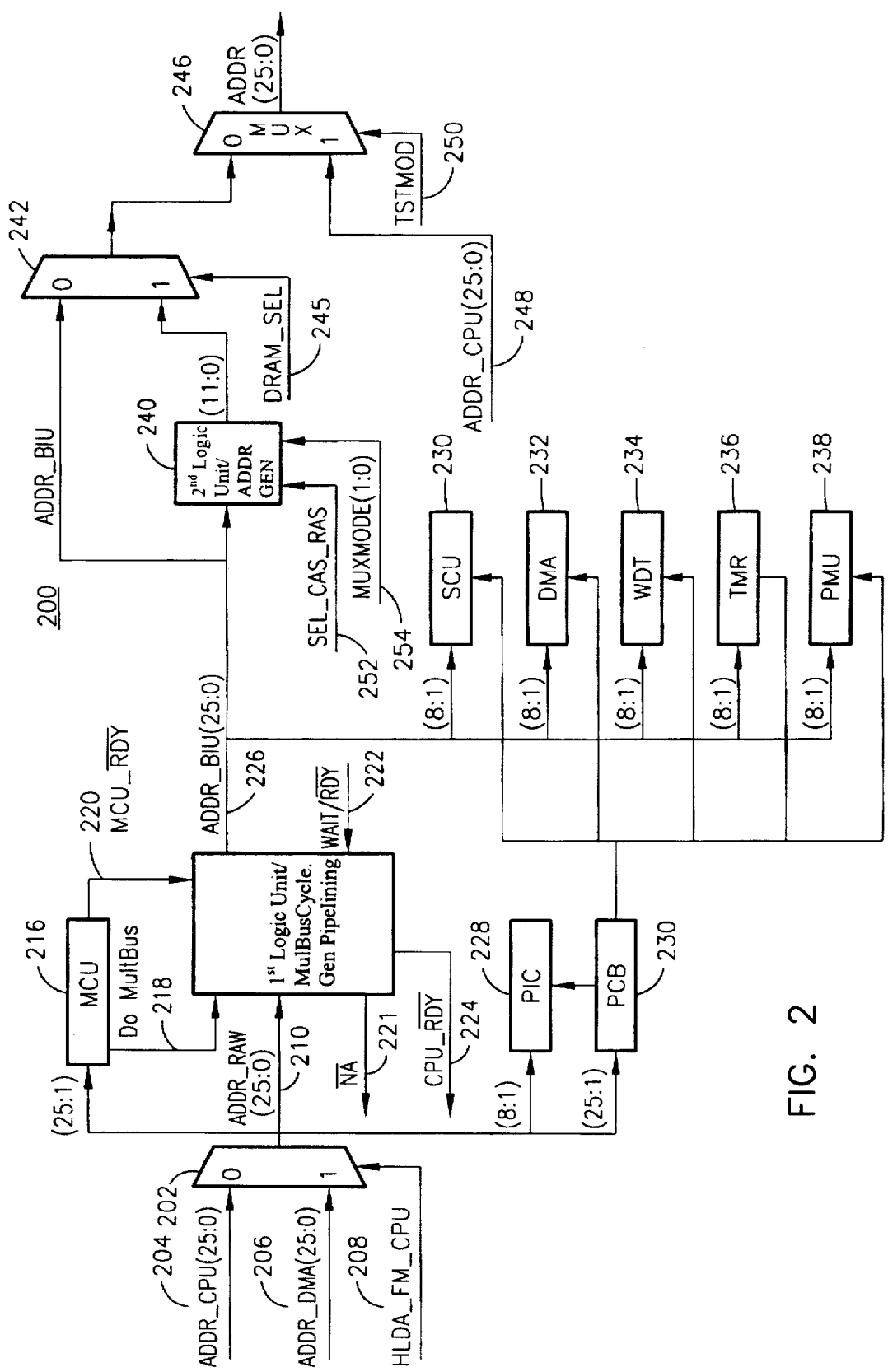
FIG. 2 is a block diagram of the address bus architecture of the present invention.

Referring to FIG. 2 there is shown an embodiment of an integrated chip architecture 200 of the present invention. The integrated chip 200 includes a first device 202 to select between an address ADDR_CPU, indicated at 204, generated by a CPU (central processing unit-not shown) or an address, ADDR_DMA, indicated at 206, generated by a DMA (direct memory access unit-not shown). The device 202 can be a multiplexer and the select signal, HLDA_FM_CPU, indicated at 208, is generated by the CPU (not shown).

The selected address is output from device 202 onto a first address path 210. The selected address contains 26 bits which is indicated by ADDR_RAW (25:0) at 212. All 26 bits are read by a first logic unit 214 which is a multiple bus cycle generation and pipelining unit. Bits 1 through 25 are read by an MCU 216 (memory control unit) which outputs two signals to the first logic unit 214. The first signal, indicated at 218, is a signal to direct the first logic unit 214 to do a multiple bus cycle and the second signal, indicated at 220, is an MCU_RDY signal, which indicates ready time of the memory which is programmed in the memory control unit register. This is programmed by the application program. Also input to the first logic unit 214 is a Wait/RDY (RDY with a bar) signal, indicated at 222, sent from memory. This signal indicates that the memory is not ready, thus the Wait signal, or that the memory is ready, thus the RDY (bar) signal. The first logic unit 214 outputs a CPU_RDY (RDY with a bar) signal, indicated at 224. This signal compiles the information from the MCU_RDY (bar) signal 220, the Wait/RDY (bar) signal 222, and the DoMultibus signal 218 and generates the ultimate ready status signal, CPU_RDY (bar) 224 to the CPU (not shown).

The PIC (programmable interrupt controller) unit 228 reads bits 1 through 8 of the address on address path 210 and the PCB (peripheral control block) unit 230 reads bits 1 through 25 of the address on address path 210. The PCB unit 230 has an output to each of the peripheral units.

The peripheral units shown in FIG. 2 are for illustrative purposes only and could include other peripheral units. The peripheral units shown include the SCU (serial communications unit) 230, the DMA (direct memory access) unit 232, the WDT (watchdog timer) unit 234, the TMR (timer) unit 236, and the PMU (power management unit 238. Each of the peripheral units, 230 through 238 read bits 1 through 8 from the second address path 226. Each of the peripheral units have data in memory locations that will be placed on a data bus upon receipt of an address via the address path and upon an address enable input from the PCB unit 230.

The address on the second address path 226 will be read by a second logic unit 240, the address generator unit which has an output to a second device 242 which also has an input directly from the second address path 226, indicated at 244. The second device 242 has a select input DRAM_SEL, indicated at 245, which determines which input the second device 242 is to output to a third device 246 which also has an input ADDR_CPU, indicated at 248, which is an address input directly from the CPU (not shown). The third device 246 has a select input TSTMOD (test mode), indicated at 250.

The second logic unit 240 has a SEL_CAS_RAS (column or row address strobe input), indicated at 252. The SEL_CAS_RAS signal indicates to ADDR GEN 240 the timing for column and row addresses. The SEL_CAS_RAS signal is generated by the MCU 216.

The second logic unit 240 also has an input MUXMODE, indicated at 254, which decides the number of bits in the column and row addresses of DRAM after being decoded by the ADDR GEN 240. The MUXMODE signal 254 is generated by the MCU 240.

Figure 3:
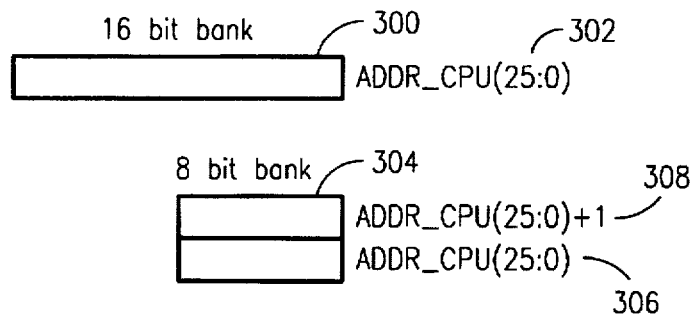
FIG. 3 is a diagram of a single 16 bit memory location and a diagram of two consecutive 8 bit memory locations that would contain the same data as the single 16 bit memory location.

Referring to FIG. 3 there is indicated the relationship of a 16 bit memory bank 300 having an input address ADDR_CPU (25:0), indicated at 302, which addresses a single 16 bit memory location in the 16 bit memory bank 300, to an 8 bit memory bank 304 having an address ADDR_CPU (25:0), indicated at 306, which addresses a first memory location, and a second address ADDR_CPU (25:0)+1, indicated at 308, which addresses the next contiguous memory location in the 8 bit memory bank 304.

Figure 4:
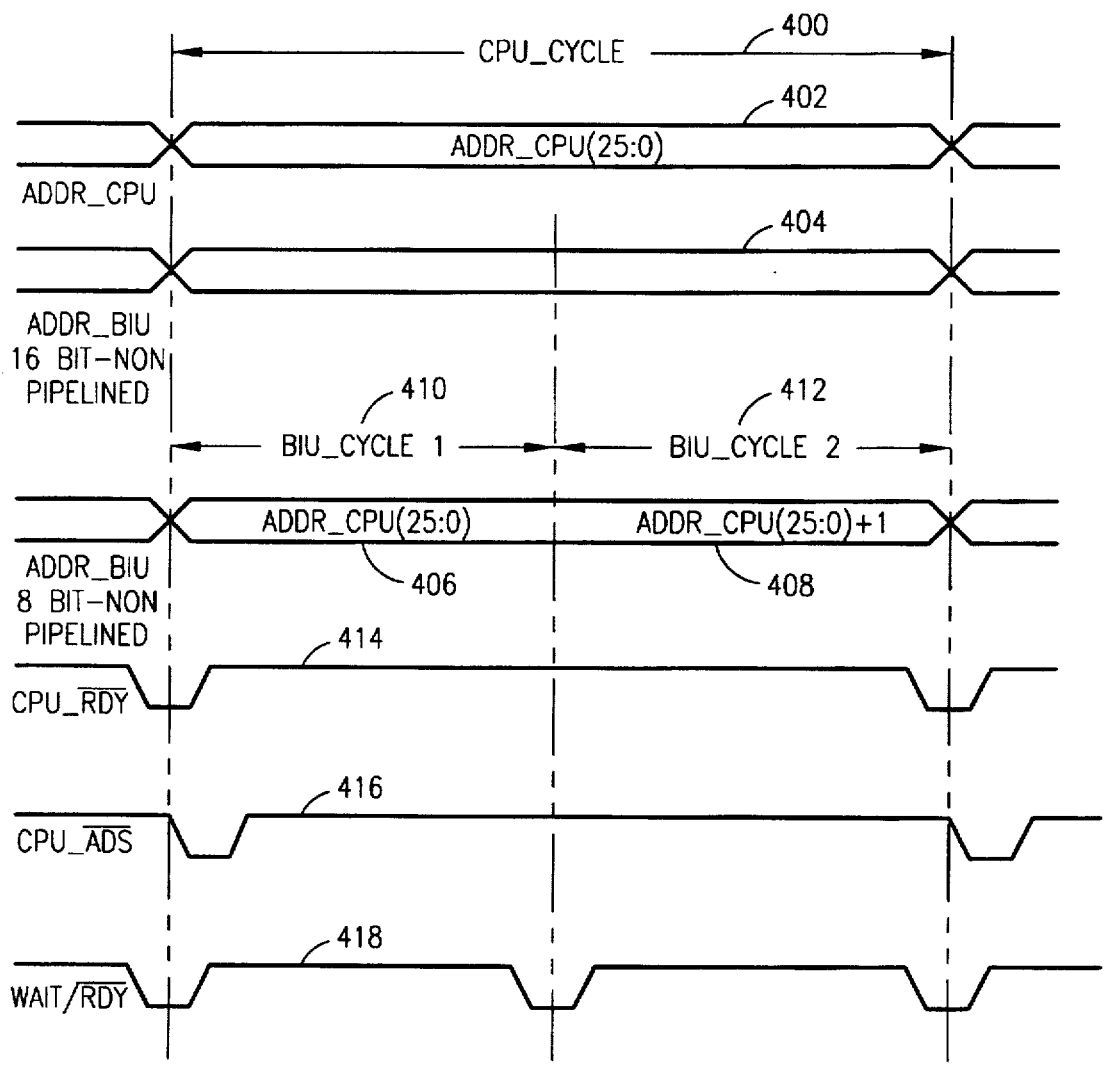
FIG. 4 is a timing diagram showing a CPU cycle for an 8 bit data size memory and the corresponding two BIU cycles.

Referring to FIG. 4 there is shown various timing diagrams illustrating the relationship between various signals within the integrated chip of the present invention. A CPU_CYCLE is indicated at 400. An ADDR_CPU is indicated at 402, and indicates that an ADDR_RAW (ADDR_CPU) is on the first address path 210 (FIG. 2) for a complete CPU_CYCLE 400. An ADDR_BIU 16 bit data size memory-nonpipelined address is indicated at 404 and indicates that such an address is on the second address path 226 (FIG. 2) for a complete CPU_CYCLE 400. An ADDR_BIU 8 bit data size memory-nonpipelined pair of addresses is indicated at 406 and 408 and indicates that two BIU_CYCLES for 8 bit data size memory, indicated at 410 and 412, can be accommodated within one CPU_CYCLE 400. A CPU_RDY (RDY bar) timing diagram is shown at 414 and indicates that a CPU_RDY (RDY bar) signal is asserted at the end of each CPU_CYCLE. A CPU_ADS (ADS bar) timing diagram is shown at 416 which when asserted by the CPU indicates the valid time of CPU address and status of output signals. The NA (bar) signal 221 (FIG. 2) to CPU is provided by the multicycle generation unit 214 and allows the CPU to output the address of the next cycle before the end of the current cycle.

A Wait/RDY (RDY bar) timing diagram is shown at 418 and indicates that a Wait/RDY (RDY bar) signal is asserted (active-low) to terminate each ADDR_BIU cycle.

The Wait/RDY (RDY bar), MCU_RDY (RDY bar), and DoMultibus signals are processed by the logic unit 214 to generate the CPU_RDY (RDY bar) signal 224. If the cycle is not a multibus cycle, the ready statuses of Wait/RDY (RDY bar) signal 222 and MCU_RDY (RDY bar) signal 220, whichever is the latest, decides the timing of the CPU_RDY (RDY bar) signal 224. In case of multibus cycle generation, no CPU_RDY (RDY bar) signal 224 is produced at the end of the first BIU cycle. The CPU_RDY (RDY bar) signal 224 at the end of the second BIU cycle is made from Wait/RDY (RDY bar) and the MCU_RDY (RDY bar) as described above. The first BIU cycle is ended by the ready statuses of Wait/RDY (RDY bar) signal 222 and MCU_RDY (RDY bar) signal 220, whichever is the latest).

Figure 5:
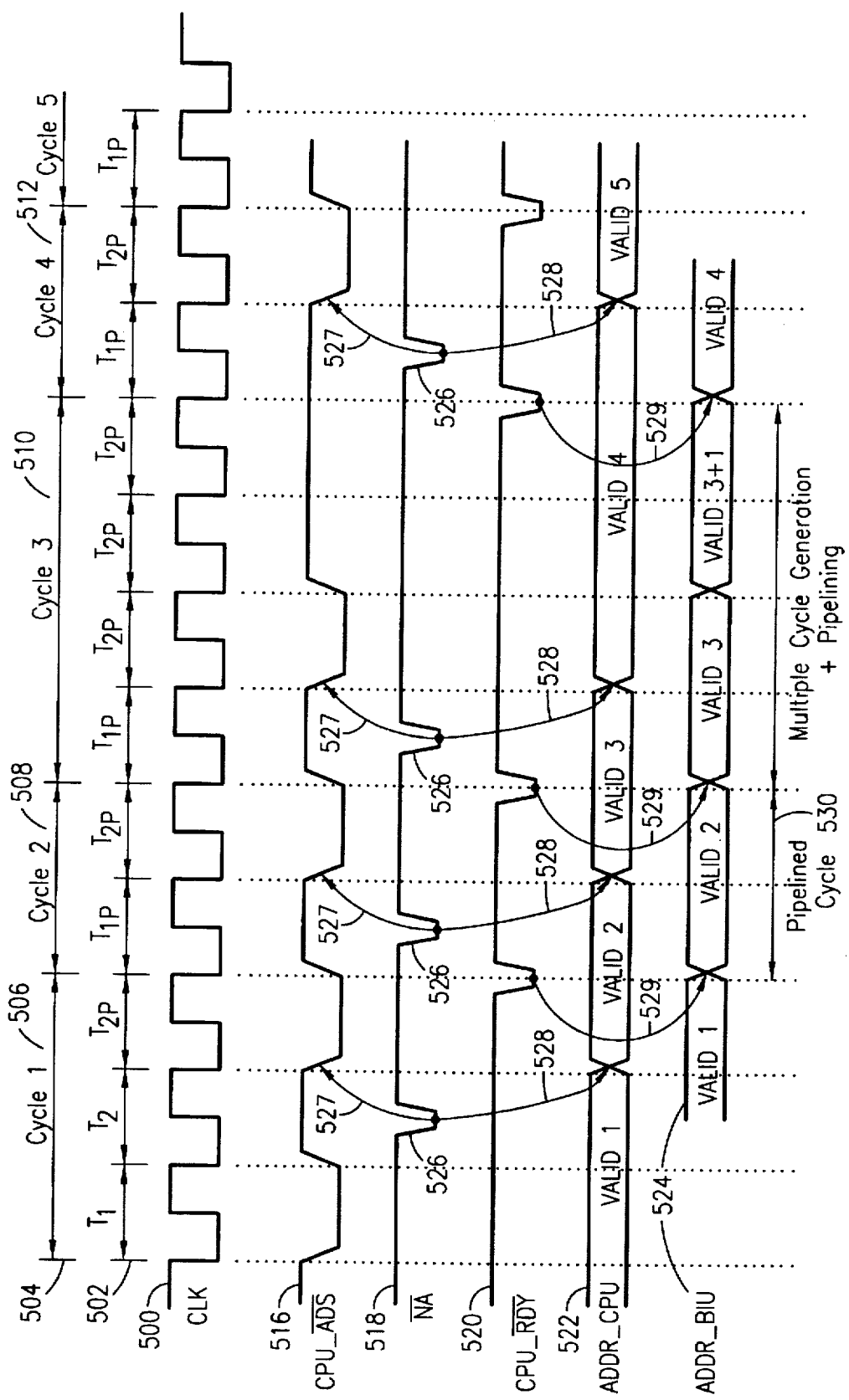
FIG. 5 is a timing diagram showing a single cycle with pipelining and pipelining with multiple cycle generation.

Referring to FIG. 5 there is shown single cycle pipelining and pipelining with multiple cycle generation. FIG. 5 clearly shows the essential benefit of the address pipelining described in the present invention. The essential benefit is that ADDR-CPU is available at least 1 clock cycle earlier than ADDR-BIU. This early availability of address is used for decoding and that helps to make the BIU cycles use the least number of clocks. A clock timing diagram is shown at 500. Shown at 502 are timing diagrams showing how the clock cycles are utilized within CPU cycles which are shown at 504. CPU cycle 1, indicated at 506, has three clock cycles which are divided into three portions, $T_1$, $T_2$, and $T_{2P}$. CPU cycle 2, indicated at 508, has two clock cycles, $T_{1P}$ and $T_{2P}$. CPU cycle 3, indicated at 510, has four clock cycles which are divided into four portions, $T_{1P}$, $T_{2P}$, $T_{2P}$, and $T_{2P}$. CPU cycle 4, indicated at 512, has two clock cycles which are divided into two portions, $T_{1P}$ and $T_{2P}$.

The timing diagram for CPU_ADS (ADS bar) is shown at 516, the timing diagram for NA (indicates that the next address is a pipelined address) is shown at 518, the timing diagram for CPU_RDY (RDY bar) is shown at 520, the timing diagram for ADDR_CPU is shown at 522, and the timing diagram for ADDR_BIU is shown at 524. The timing diagram for CPU_ADS (ADS bar) 516 indicates the validity of a CPU address on the address path. When NA is asserted as shown at 526, it indicates that the next address on the address path from the CPU is a pipelined address which is indicated on the timing diagram for CPU_ADS (ADS bar) at 527. In addition, the assertion of NA indicates that address indicated by ADDR_CPU is valid as indicated at 528. The assertion of a CPU_RDY (RDY bar) signal indicates that the address on the ADDR_BIU path (the second address path) is valid as indicated at 529. As indicated at 530, Cycle 2 508 is a pipelined cycle and cycle 3 510 is a multiple cycle with pipelining as indicated at 532.

The foregoing description of the preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications which are suited to the particular use contemplated. All such modifications and variations are within the scope of the invention as determined by the appended claims when interpreted in accordance with the breadth to which they are fairly, legally, and equitably entitled.

We claim:

1. A microprocessor system having one or more address generation devices, at least one memory location, and at least one peripheral unit, wherein the microprocessor system comprises:

a first address path;

a second address path;

a first logic unit to condition an address from the first address path for the second address path, wherein the first logic unit includes logic to convert a single address for a 16 bit data size memory into two addresses for 8 bit data size memory and wherein the first logic unit maintains a first address on the second address path when an address generation device is in a next address pipeline mode;

a second logic unit to select a memory architecture;

a first device to select an address from the one or more address generation devices;

a second device to select an output from the second logic unit or from the second address path; and a third device to select an output from the second device or an address from an address generation device.

2. The microprocessor system of claim 1, wherein the third device selects an address from an address generating device when enabled by a testmode signal.

3. The microprocessor system of claim 2, wherein the second device selects an output from the second logic unit when enabled by a DRAM select signal.

4. The microprocessor system of claim 3, further comprising a column address strobe and row address strobe input to the second logic unit.

5. The microprocessor system of claim 4, further comprising a memory control unit which receives an address from the first address path and outputs a first signal to the first logic unit.

6. The microprocessor of claim 5, wherein the first signal output from the memory control unit is a signal instructing the first logic unit to do a multicycle operation.

7. The microprocessor of claim 6, wherein the memory control unit outputs a second signal to the first logic unit indicating the programmed ready time of the memory.

8. The microprocessor system of claim 7, further comprising a programmable interrupt controller which receives a portion of the address on the first address path.

9. The microprocessor system of claim 8, further comprising a peripheral control block which receives a portion of the address on the first address path.

* * * * *